US010363719B2

(12) United States Patent
Niedersüss et al.

(10) Patent No.: US 10,363,719 B2
(45) Date of Patent: Jul. 30, 2019

(54) MONOAXIALLY ORIENTED MULTILAYER CAST FILM

(71) Applicant: BOREALIS AG, Vienna (AT)

(72) Inventors: Peter Niedersüss, Ried/Riedmark (AT); Johan Defoer, Mechelen (BE)

(73) Assignee: Borealis AG, Vienna (AT)

( * ) Notice: Subject to any disclaimer, the term of this patent is extended or adjusted under 35 U.S.C. 154(b) by 101 days.

(21) Appl. No.: 15/564,906

(22) PCT Filed: Apr. 6, 2016

(86) PCT No.: PCT/EP2016/057477
§ 371 (c)(1),
(2) Date: Oct. 6, 2017

(87) PCT Pub. No.: WO2016/162357
PCT Pub. Date: Oct. 13, 2016

(65) Prior Publication Data
US 2018/0126695 A1     May 10, 2018

(30) Foreign Application Priority Data
Apr. 10, 2015 (EP) .................................... 15163093

(51) Int. Cl.
| B32B 7/02 | (2019.01) |
| B32B 27/32 | (2006.01) |
| B32B 23/04 | (2006.01) |
| B32B 7/12 | (2006.01) |
| B32B 15/08 | (2006.01) |
| B32B 15/20 | (2006.01) |
| B32B 27/08 | (2006.01) |
| B32B 27/34 | (2006.01) |
| B32B 27/36 | (2006.01) |
| B65D 75/00 | (2006.01) |
| B65D 81/34 | (2006.01) |
| C08L 1/00 | (2006.01) |

(52) U.S. Cl.
CPC .............. *B32B 7/02* (2013.01); *B32B 23/046* (2013.01); *B32B 27/32* (2013.01); *B32B 7/12* (2013.01); *B32B 15/08* (2013.01); *B32B 15/20* (2013.01); *B32B 27/08* (2013.01); *B32B 27/327* (2013.01); *B32B 27/34* (2013.01); *B32B 27/36* (2013.01); *B32B 2250/03* (2013.01); *B32B 2250/24* (2013.01); *B32B 2250/242* (2013.01); *B32B 2270/00* (2013.01); *B32B 2307/306* (2013.01); *B32B 2307/308* (2013.01); *B32B 2307/31* (2013.01); *B32B 2307/412* (2013.01); *B32B 2307/516* (2013.01); *B32B 2307/54* (2013.01); *B32B 2307/7244* (2013.01); *B32B 2307/7265* (2013.01); *B32B 2307/732* (2013.01); *B32B 2307/736* (2013.01); *B32B 2323/10* (2013.01); *B32B 2439/06* (2013.01); *B32B 2439/46* (2013.01); *B32B 2439/70* (2013.01); *B65D 75/008* (2013.01); *B65D 81/3438* (2013.01); *C08L 1/00* (2013.01)

(58) Field of Classification Search
None
See application file for complete search history.

(56) References Cited

U.S. PATENT DOCUMENTS

| 3,300,459 | A | 1/1967 | Natta et al. |
| 5,919,877 | A | 7/1999 | Tanaglia |
| 9,840,616 | B2 | 12/2017 | Gahleitner et al. |
| 2009/0155614 | A1 | 6/2009 | Mcleod et al. |
| 2010/0215933 | A1 | 8/2010 | Fiscus et al. |
| 2011/0052929 | A1 | 3/2011 | Nairn et al. |
| 2012/0251749 | A1* | 10/2012 | Lee .......................... C08J 5/18 428/35.2 |

FOREIGN PATENT DOCUMENTS

| CN | 103748163 | 4/2014 |
| EP | 0 060 090 | 9/1982 |
| EP | 0426382 | 5/1998 |
| EP | 1 803 772 | 7/2007 |
| EP | 2 543 684 | 1/2013 |
| EP | 2586823 | 1/2013 |
| EP | 2 730 393 | 5/2014 |
| WO | 1992/12182 | 7/1992 |
| WO | 99/24478 | 5/1999 |
| WO | 00/68315 | 11/2000 |
| WO | 2006/125672 | 11/2006 |
| WO | 2010/008696 | 1/2010 |
| WO | 2013/127707 | 9/2013 |
| WO | 2013/144061 | 10/2013 |
| WO | 2014/023604 | 2/2014 |

OTHER PUBLICATIONS

International Search Report and Written Opinion for PCT/EP2016/057477 dated Jun. 10, 2016, 9 pgs.
Poelt, P., et al., "Characterization of Modified Polypropylene by Scanning Electron Microscopy," Journal of Applied Polymer Science, 2000, pp. 1152-1161, vol. 78.
EniChem, "DUTRAL, Ethylene-Propylene Elastomers", 7 pgs.

* cited by examiner

*Primary Examiner* — Robert T Butcher
(74) *Attorney, Agent, or Firm* — Lowenstein Sandler LLP

(57) ABSTRACT

Multilayer cast film, which is oriented in machine direction and comprises at least one outer layer, one core layer and one sealing layer, as well as its use in retort stand up pouches.

13 Claims, No Drawings

MONOAXIALLY ORIENTED MULTILAYER CAST FILM

CROSS-REFERENCE TO RELATED APPLICATION(S)

This application is a national phase of International Application No. PCT/EP2016/057477, filed on Apr. 6, 2016, which claims the benefit of European Patent Application No. 15163093.6, filed on Apr. 10, 2015. The contents of these applications are hereby incorporated by reference in their entirety.

The present invention is related to a multilayer cast film, which is oriented in machine direction and comprises at least one outer layer, one core layer and one sealing layer, as well as its use in retort stand up pouches.

Stand-up pouches are today one of the fastest developing applications within food packaging, replacing tin cans and glass jars, since pouches compared to traditional packaging types deliver great value through light-weighting, energy savings and logistical optimisation.

Retort pouch is defined as a pouch that is filled with a food product that would normally spoil at room temperature, and is subsequently retorted (sterilized with heat) to create a shelf-stable packaged product. An unfilled pouch that is capable of being filled with product and subsequently retorted is also termed a retort pouch.

Pouch designers are faced with many requirements in the retort pouch market. Designers address these requirements by constructing retort pouches with three or four structural materials to provide oxygen barrier, moisture barrier, toughness, sealability, and many other properties.

Today three-layer structures are the most popular, which are exemplified by following structure: oriented polyester film (OPET)/aluminum foil or oriented polyamide film (OPA)/polypropylene sealant film.

Key requirements for the polypropylene sealant film are sealability, sterilizability, processability and mechanical strength (stiffness/toughness).

The polypropylene sealant film used for such three-layer retortable stand-up pouches comprises currently PP block copolymers as the main component.

However, it has turned out that standard PP block copolymers change significantly their properties after steam sterilization. Typically, the optical properties such as haze as well as the mechanical properties such as stiffness and seal strength are undesirable impaired.

A further problem appears, if such standard polypropylene sealant films are monoaxially oriented.

Oriented films in principle offer a wealth of advantageous properties, due to a change in the morphology of the films molecular structure such as excellent mechanical properties, impermeability to moisture, high resistance to oils and fats and scratch resistance. These films often have low haze and high gloss and can be printed upon easily.

Machine Direction Oriented (MDO) films are, however, very difficult to be sealed by means of heat sealing. Exposing the highly oriented film to heat results in severe shrinkage of the film and rather low seal strength.

The industry has generally solved this problem by designing complex multilayer film structures and using particular materials in the sealing layers of multilayer films.

It is known, for example, that homopolymers are characterised by higher melting points than copolymers making them harder to heat seal and by a very narrow sealing window and their use in sealing layers is therefore avoided. Homopolymers furthermore are too brittle after sterilization and can't be sealed anymore after being oriented in machine direction. Therefore multilayer film structures typically comprising a terpolymer, propylene random or propylene block copolymer are often used in oriented films. But state of the art multilayer structures comprising such propylene copolymers tend to delaminate when being sealed, if they are oriented. The use of oriented monolayer films comprising such propylene copolymers is also no option, since they show too high shrinkage after retort and too low stiffness.

Manufacturing consistent high-strength seals is one of the primary goals of the pouch-making process, and high-strength seals are exceptionally important for retort pouches.

In addition, the seal strength must be very high to withstand the retorting process.

Sealing is also a serious problem in more complex film operations such as in form fill and seal technology. In a typical form, fill and seal film sealing operation, the manufacturer has to seal different zones of the film. These zones may comprise 2, 3 or 4 film layers, especially where there are gussets present. Heat sealing the zones where 2 to 4 film thicknesses meet is difficult because the heat applied is often so high that the film can be damaged. If not enough heat is applied, a seal is not formed and the package integrity is at risk or the seal strength poor.

For oriented polyolefin films therefore there are problems in heat sealing which need to be overcome.

Considering all the drawbacks outlined above, it was an object of the present invention to provide a new polypropylene based sealant film structure with an excellent mechanical properties (e.g. tensile modulus) and optical properties and simultaneously high seal strength and low shrinkage before and still after steam sterilization, thus being suitable for use in retort stand up pouches.

Thus, the present invention is based on the finding that all drawbacks outlined above can be solved with a special multilayer cast film, which is oriented in machine direction and comprises at least one outer layer, one core layer and one sealing layer.

Therefore the present invention is related to a multilayer cast film oriented in machine direction, which comprises at least three layers A, B and C, whereby a) layer A is an outer layer comprising a heterophasic propylene copolymer,
b) layer B is the core layer comprising a high isotacticity polypropylene homopolymer and
c) layer C is a sealing layer comprising a propylene based random copolymer or terpolymer, optionally in combination with a heterophasic propylene copolymer, whereby the machine direction oriented multilayer cast film has (i) a tensile modulus measured according to ISO 527-3 on a 50 µm film in machine direction of at least 2600 MPa and in transverse direction of at least 1200 MPa
(ii) a haze value measured according to ASTM D1003 on a 50 µm film of at most 5.5% and
(iii) a shrinkage measured according to the method as described in the experimental part on a 50 µm film after 10 minutes at 100° C. in machine direction of at most −3.0%.

The above defined multilayer film is characterized by a high seal strength, if laminated to an aluminum foil or an oriented polyamide film (OPA) before and after being subjected to steam sterilization, thus being suitable for the use in retortable stand up pouches.

Therefore a further aspect of the present invention is the use of the above defined multilayer film as sealing film in retortable stand up pouches, preferably in three-layer structures, which are exemplified by following structures:

oriented polyester film (OPET)/aluminum foil/ polypropylene sealing film or oriented polyester film (OPET)/oriented polyamide film (OPA)/ polypropylene sealing film.

The multilayer cast film oriented in machine direction, which comprises at least three layers A, B and C is now described in more detail.

Layer A:

Layer A of the inventive multilayer film comprises, preferably is composed of, a heterophasic propylene copolymer.

Suitable heterophasic propylene copolymers (HECO) comprise a) 75 to 95 wt % of a polypropylene matrix (PP-M) with an $MFR_2$ (ISO 1133, 230° C., 2.16 kg) of 0.5 to 30.0 g/10 min being a homopolymer or a copolymer which has a comonomer content of less than 10.0 wt %, b) 5 to 25 wt % of an propylene/alpha-olefin rubber (EPR) with at least 50 wt % propylene having an intrinsic viscosity (IV) of 0.8 to 2.5 dl/g; and c) 0.0001 to 1 wt % of an alpha-nucleating agent (NA).

Preferably, in the heterophasic propylene copolymer, the polypropylene matrix (PP-M) has a comonomer content of less than 10 wt % based on the matrix (PP-M), more preferably of less than 5 wt % based on the matrix (PP-M), even more preferably less than 2 wt % based on the matrix (PP-M), and most preferably the polypropylene matrix (PP-M) is a propylene homopolymer.

Preferably, the comonomers—if present—used for the production of the polypropylene matrix (PP-M) may be selected from but are not limited to ethylene and/or $C_4$- to $C_{20}$-alpha-olefins. However, ethylene and/or $C_4$- to $C_{20}$-alpha-olefins are preferred, even more preferred are ethylene and/or $C_4$- to $C_{15}$-alpha-olefins, even more preferred are ethylene and/or $C_4$- to $C_{10}$-alpha-olefins and most preferred are ethylene and/or $C_4$- to $C_6$-alpha-olefins.

Preferably, the polypropylene matrix (PP-M) has an $MFR_2$, measured according to ISO 1133 at 230° C. and under a load of 2.16 kg, of at least 0.5 g/10 min, more preferably of at least 1.0 g/10 min and most preferably of at least 1.5 g/10 min.

Preferably, the polypropylene matrix (PP-M) has an $MFR_2$, measured according to ISO 1133 at 230° C. and under a load of 2.16 kg, of not more than 30 g/10 min, more preferably of not more than 20 g/10 min and most preferably of not more than 10 g/10 min.

Preferably, the polypropylene matrix (PP-M) has an intrinsic viscosity (IV) of not more than 4.5 dl/g, more preferably of not more than 4.0 dl/g and most preferably of not more than 3.5 dl/g.

Further, preferably, the polypropylene matrix (PP-M) has an intrinsic viscosity (IV) of at least 1.5 dl/g, more preferably of at least 1.8 dl/g and most preferably of at least 2.0 dl/g.

Preferably, the comonomers used for the production of the propylene/alpha-olefin rubber (EPR) may be selected from but are not limited to ethylene and/or $C_4$- to $C_{20}$-alpha-olefins. However, ethylene and/or $C_4$- to $C_{20}$-alpha-olefins are preferred, even more preferred are ethylene and/or $C_4$- to $C_{15}$-alpha-olefins, even more preferred are ethylene and/or $C_4$- to $C_{10}$-alpha-olefins, e.g. ethylene, 1-butene, 1-hexene, 1-octene, and most preferably the alpha-olefin is ethylene.

Preferably, the propylene/alpha-olefin rubber (EPR) has a comonomer content of not more than 50 wt %, more preferably of not more than 45 wt. % and most preferably of not more than 40 wt % based on the propylene/alpha-olefin rubber (EPR).

Preferably, the propylene/alpha-olefin rubber (EPR) has a comonomer content of at least 15 wt %, more preferably of at least 20 wt % based on the propylene/alpha-olefin rubber (EPR).

Further, preferably, the amount of the propylene/alpha-olefin rubber (EPR), determined as xylene solubles (XS), is not more than 25.0 wt. %, more preferably not more than 20.0 wt. % and most preferably not more than 15.0 wt. % based on the heterophasic propylene copolymer (HECO).

Preferably, the amount of the propylene/alpha-olefin rubber (EPR), determined as xylene solubles (XS), is at least 5.0 wt %, more preferably is at least 7.5 wt % and most preferably is at least 10 wt % based on the heterophasic propylene copolymer (HECO).

Further, preferably, the intrinsic viscosity (IV) of the propylene/alpha-olefin rubber (EPR) is at least 0.8 dl/g, more preferably is at least 1.0 dl/g, and most preferably is at least 1.2 dl/g, the propylene/alpha-olefin rubber (EPR)being measured as xylene soluble fraction as described above.

Further, preferably, the intrinsic viscosity (IV) of the propylene/alpha-olefin rubber (EPR) is not more than 2.5 dl/g, more preferably is not more than 2.3 dl/g and most preferably is not more than 2.1 dl/g, the propylene/alpha-olefin rubber (EPR) being measured as xylene soluble fraction as described above.

Further, preferably, the ratio IV(EPR)/IV(PP-M) is not higher than 0.85 and more preferably not higher than 0.80.

Preferably, the propylene/alpha-olefin rubber (EPR) is dispersed within the polypropylene matrix (PP-M), preferably in the form of particles, more preferably said particles have a weight average particle size of less than 1.00 µm, more preferably less than 0.50 µm; further, preferably, said particles have a weight average particle size of at least 0.05 µm, more preferably of at least 0.10 µm.

A suitable method for determining this weight average particle size is described in the paper "Characterization of Modified Polypropylene by Scanning Electron Microscopy" by Pölt P, Ingolic E, Gahleitner M, Bernreitner K, Geymayer W, *J. Appl. Polym. Sci.* 78, (2000), 1152 ff.

In addition, preferably the heterophasic propylene copolymer (HECO) is alpha-nucleated with a nucleating agent. Such an alpha-nucleation can be carried out by using any suitable alpha-nucleating agent or alpha-nucleating method known in the art.

The alpha-nucleating agent, if present, is preferably selected from the group consisting of sodium benzoate, 1,3:2,4-bis-(3,4-dimethyl-benzylidene)-sorbitol, sodium-2,2'-methylenebis-(4,6-di-tert-butyl-phenyl)-phosphate, hydroxybis-(2,4,8,10-tetra-tert-butyl-6-hydroxy-12h-dibenzo-(d,g)(1,3,2)-dioxaphosphocin-oxidato)-aluminium, ADK STAB NA-21 (Adeka Palmarole, France), Hyperform HPN-20 E (Milliken, USA) or mixtures thereof.

A further and preferred alpha-nucleation method, is a special reactor technique, where the catalyst is prepolymerized with at least one vinyl compound, said method is herein later referred to as "BNT". This method is described in detail in EP 1 028 984 and EP 1 183 307. For the purpose of this invention "BNT" is referred to as alpha-nucleating agent.

Preferred vinyl compounds to be used in the Borstar Nucleation Technology (BNT)-method are represented by the following formula

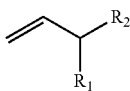

wherein $R^1$ and $R^2$ are independently selected from $C_1$-$C_4$-alkyl groups or they form together a saturated, an unsaturated or an aromatic five- or six-membered ring, whereby this ring may be substituted and/or bridged with one or more $C_1$- or $C_2$-alkyl groups.

More preferably the vinyl compound is selected from vinyl cycloalkanes, e.g. vinyl cyclopentane, vinyl cyclohexane, vinyl-2-methyl-cyclohexane and vinyl norbonane, 3-methyl-1-butene, styrene, p-methyl-styrene, 3-ethyl-1-hexene or mixtures thereof, particularly preferred is vinyl cyclohexane (VCH).

Preferably, the catalyst is prepolymerized in the BNT method at a temperature significantly below the polymerization temperature.

In case the catalyst is prepolymerized with the BNT method as described above, said prepolymer fraction is preferably present in an amount of up to 1.0 wt %, more preferably up to 0.5 wt % and most preferably up to 0.2 wt % based on the heterophasic propylene copolymer (HECO).

In case the catalyst is prepolymerized with the BNT method as described above, said prepolymer fraction is preferably present in an amount of at least 0.0001 wt %, more preferably of at least 0.001 wt %, even more preferably of at least 0.005 wt %, and most preferably of at least 0.01 wt % based on heterophasic propylene copolymer (HECO).

Therefore, in a preferred embodiment, the heterophasic propylene copolymer (HECO) comprises:
An optional prepolymer fraction (PRE-PP)
the propylene homopolymer or random copolymer as matrix phase (PP-M) and
a propylene/alpha-olefin copolymer rubber (EPR) dispersed in the matrix (PP-M).

Preferably, the prepolymer fraction (PRE-PP), if present, has been prepolymerized with the BNT-method as described above.

It is particular preferred, that the sum of the matrix (PP-M) and the rubber (EPR) and, if present, prepolymer fraction (PRE-PP) make up at least 98.0 wt. %, more preferably at least 99.0 wt. % and most preferably at least 99.5 wt. % of the heterophasic propylene copolymer (HECO) and most preferably the heterophasic propylene copolymer (HECO) consists of components (PP-M), (EPR) and (PRE-PP).

If the prepolymer fraction (PRE-PP) is present in heterophasic propylene copolymer (HECO), preferably, the amount of the prepolymer fraction (PRE-PP) is up to 1.0 wt %, more preferably up to 0.5 wt % and most preferably up to 0.2 wt % based on heterophasic propylene copolymer (HECO).

Further, if the prepolymer fraction (PRE-PP) is present in heterophasic propylene copolymer (HECO), preferably, the amount of the prepolymer fraction (PRE-PP) is at least 0.0001 wt %, more preferably is at least 0.001 wt %, even more preferably is at least 0.005 wt %, and most preferably is at least 0.01 wt % based on the heterophasic propylene copolymer (HECO).

Preferably, the polypropylene matrix (PP-M) is present in an amount of at least 75.0 wt %, more preferably of at least 80.0 wt % and most preferably of at least 82.5 wt % based on the heterophasic propylene copolymer (HECO).

Further preferably, the polypropylene matrix (PP-M) is present in an amount of not more than 95.0 wt %, more preferably of not more than 92.5 wt % and most preferably of not more than 90.0 wt % based on the heterophasic propylene copolymer (HECO).

Production of Polypropylene Matrix (PP-M)

The propylene polymer may be produced by single- or multistage process polymerization of propylene or propylene and alpha-olefin and/or ethylene such as bulk polymerization, gas phase polymerization, slurry polymerization, solution polymerization or combinations thereof using conventional catalysts. A homo- or copolymer can be made either in loop reactors or in a combination of loop and gas phase reactor. Those processes are well known to one skilled in the art.

A suitable catalyst for the polymerization of the propylene polymer is any stereospecific catalyst for propylene polymerization which is capable of polymerizing and copolymerizing propylene and comonomers at a temperature of 40 to 110° C. and at a pressure from 10 to 100 bar. Ziegler Natta catalysts as well as metallocene catalysts are suitable catalysts. One skilled in the art is aware of the various possibilities to produce propylene homo- and copolymers and will simply find out a suitable procedure to produce suitable polymers which are used in the present invention.

Production of Propylene-alpha Olefin Rubber (EPR)

A propylene-alpha olefin-rubber (EPR) may be produced by known polymerization processes such as solution, suspension and gas-phase polymerization using conventional catalysts. Ziegler Natta catalysts as well as metallocene catalysts are suitable catalysts.

A widely used process is the solution polymerization. Ethylene, propylene and catalyst systems are polymerized in an excess of hydrocarbon solvent. Stabilisers and oils, if used, are added directly after polymerization. The solvent and unreacted monomers are then flashed off with hot water or steam, or with mechanical devolatilization. The polymer, which is in crumb form, is dried with dewatering in screens, mechanical presses or drying ovens. The crumb is formed into wrapped bales or extruded into pellets.

The suspension polymerization process is a modification of bulk polymerization. The monomers and catalyst system are injected into the reactor filled with propylene. The polymerization takes place immediately, forming crumbs of polymer that are not soluble in the propylene. Flashing off the propylene and comonomer completes the polymerization process.

The gas-phase polymerization technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of rubber (EPR) is also described in detail in e.g. U.S. Pat. Nos. 3,300,459, 5,919,877, EP 0 060 090 A1 and in a company publication by EniChem "DUTRAL, Ethylene-Propylene Elastomers", pages 1-4 (1991).

Alternatively, a propylene/alpha-olefin rubber (EPR), which is commercially available and which fulfil the indicated requirements, can be used.

Alternatively, polymers (PP-M) and (EPR) may be produced in a series of reactors, i.e. starting with the production of the matrix (PP-M) in a loop reactor and transferring the product into a gas phase reactor, where the rubber (EPR) is polymerized.

A loop reactor—gas phase reactor system is well known as Borealis technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerization may also be carried out in bulk where the reaction medium is formed from the monomer being polymerized.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer.

A chain-transfer agent, preferably hydrogen, can be added as required to the reactors. Preferably a prepolymerization step precedes the actual polymerization process.

Layer B:

Layer B of the inventive multilayer film comprises, preferably is composed of, a high isotacticity polypropylene homopolymer (HIPP).

The expression homopolymer used in the instant invention relates to a polypropylene that consists substantially, i.e. of at least 99.5 wt %, more preferably of at least 99.8 wt %, of propylene units. In a preferred embodiment only propylene units in the propylene homopolymer (HIPP) are detectable.

The comonomer content can be determined with $^{13}C$ NMR spectroscopy, as described below in the examples.

Further, it is appreciated that the propylene homopolymer (HIPP) is a linear polypropylene.

Suitable high isotacticity polypropylene homopolymers (HIPP) comprise propylene homopolymers having a high crystallinity and a broad molecular weight distribution.

Suitable high isotacticity polypropylene homopolymers (HIPP) are therefore characterized by
(i) an isotacticity expressed in mmmm pentads of at least 96 mol %, measured by means of 13C-NMR,
(ii) a xylene cold soluble (XCS) content of equal or below 2.0 wt %
(iii) a decaline soluble content measured according to the method as described in the experimental part of equal or below 2.0 wt % and
(iv) polydispersity index (PI) of at least 5.5.

In a preferred embodiment of the present invention, the polypropylene homopolymer (HIPP) is highly isotactic. Accordingly it is appreciated that the polypropylene homopolymer (HIPP) has a rather high pentad isotacticity <mmmm>, i.e. higher than 96.0 mol %, more preferably higher than 97.0 mol %.

Preferably, the isotacticity <mmmm> of the polypropylene homopolymer (HIPP) is in the range of 96.0 to 99.5 mol %, preferably in the range of 96.0 to 98.5 mol %, still more preferably in the range of 97.0 to 98.0 mol %.

Suitable polypropylene homopolymers (HIPP) are featured by a rather low xylene cold soluble (XCS) content. Therefore, in a further preferred embodiment of the present invention, the polypropylene homopolymer (HIPP) of the instant invention is featured by rather low xylene cold soluble (XCS) content, i.e. by a xylene cold soluble (XCS) content of equal or below 2.0 wt %, more preferably of equal or below 1.8 wt %, yet more preferably equal or below 1.6 wt %.

Thus it is in particular appreciated that the polypropylene homopolymer (HIPP) of the instant invention has a xylene cold soluble (XCS) content in the range of 0.3 to equal or below 2.0 wt %, more preferably in the range of 0.3 to equal or below 1.8 wt %, yet more preferably in the range of 0.4 to equal or below 1.6 wt %.

The amount of xylene cold soluble (XCS) additionally indicates that the polypropylene homopolymer (HIPP) is preferably free of any elastomeric polymer component, like an ethylene propylene rubber. In other words the polypropylene (PP) shall be not a heterophasic polypropylene, i.e. a system consisting of a polypropylene matrix in which an elastomeric phase is dispersed. Such systems are featured by a rather high xylene cold soluble content.

The decaline soluble content measured according to the method as described in the experimental part of the polypropylene homopolymer (HIPP) is equal or below 2.0 wt %, preferably equal or below 1.5 wt %.

Suitable polypropylene homopolymers (HIPP) shall also have a broad molecular weight distribution (MWD), since a broad MWD improves the processability of the polymer and provides feasible means for further tailoring the mechanical and/or processing properties of the polymer depending on the needs desired for the end-use application.

The molecular weight distribution (MWD) can be measured by SEC (also known as GPC), whereby it is expressed as Mw/Mn, or by a rheological measurement, like Polydispersity Index (PI)—measurement or Shear Thinning Index (SHI)—measurement. All these measurements are known and further defined below under "Definitions and Determination Methods".

Thus the propylene homopolymer (HIPP) suitable for the invention has a polydispersity index (PI) of at least 5.5, typically of at least 5.7, and preferably of at least 6.0.

Another indicator of the broad molecular weight distribution, beside the polydispersity index (PI), is the ratio of the Mw/Mn measured by SEC. Hence, it is preferred that the Mw/Mn ratio is of at least 5, preferably of at least 5.5, and more preferably of at least 6. In turn, the upper limit of the Mw/Mn ratio is preferably no more than 20, preferably no more than 10 and more preferably no more than 9 and yet more preferably no more than 8.5.

Moreover, the molecular weight of a polymer can be further expressed by way of its melt flow rate (MFR). An increase in molecular weight means a decrease in the MFR-value. The melt flow rate (MFR$_2$) is preferably measured as described below under "Definitions and Determination methods".

The melt flow rate measured under a load of 2.16 kg at 230° C. (ISO 1133) is denoted as MFR$_2$ (230° C.).

Accordingly, it is preferred that in the present invention the polypropylene homopolymer (HIPP) has an MFR$_2$ (230° C.) of at least 1.5 g/10 min, more preferably of at least 2.5 g/10 min. Accordingly it is appreciated that the MFR$_2$ (230° C.) measured according to ISO 1133 of the polypropylene homopolymer (HIPP) is in the range of 1.5 to 10.0 g/10 min, more preferably in the range of 2.5 to 6.0 g/10 min, like in the range of 2.5 to 4.5 g/10 min.

Furthermore, as stated above, the shear thinning index (SHI) is a very sensitive indicator of MWD. The higher the SHI value the broader the MWD. Therefore, the propylene polymer of the invention has preferably SHI(0/50) of at least 12, preferably of at least 14, more preferably of at least 16.

Typically SHI(0/50) may vary between the range of 15 to 22, preferably of 16 to 20. In another embodiment SHI(0/50) of 16 to 18 is feasible.

Advantageously, the propylene polymer has typically a rather high melting temperature. Accordingly, it is preferable that the melting temperature is of at least 162° C., more preferably of at least 163° C.

In addition, it is preferred that the propylene polymer has a crystallinity of at least 50% measured by DSC.

Moreover, the crystallization temperature (Tcr) shall be preferably of at least 110° C., more preferably of at least 113° C., e.g. between 110° C. and 122° C., such as 115° C. and 120° C. without any added nucleating agent. The crystallinity and thus the crystallization temperature (Tcr) of the propylene polymer can be further increased in a manner known in the field, e.g. by adding nucleation agents during or after polymerization of the polymer. In one embodiment, the propylene polymer is produced in the presence of a nucleating agent, whereby the composition has a crystallization temperature (Tcr) of 118° C. or more.

Furthermore it is appreciated, that the ash content of the polypropylene homopolymer (HIPP) is rather low, i.e. has an ash content measured according to ISO 3451-1 (1997) of equal or below 60 ppm, more preferably equal or below 50 ppm, more preferably equal or below 40 ppm, more preferably equal or below 30 ppm, like in the range of 10 to 50 ppm.

Suitable polypropylene homopolymers (HIPP) are either commercially available or can be prepared by known processes, as for example described in EP 1 883 659, EP 2 543 684 or EP 2 820 053 or WO 2014/023604.

Layer C

Layer C of the inventive multilayer film comprises, preferably is composed of, a propylene based random copolymer (RACOPO) or terpolymer (TERPO), optionally in combination with a heterophasic propylene copolymer (HECO).

Suitable propylene based random copolymers (RACOPO) or terpolymers (TERPO) are propylene/alpha-olefin copolymers or propylene/ethylene/alpha-olefin terpolymers containing
(i) 80.0 to 98.0 wt % of propylene
(ii) 0.0 to 5.0 wt % of ethylene and
(iii) 1.5 to 20.0 wt % of an alpha-olefin having 4 to 20 carbon atoms,
whereby the sum of (i), (ii) and (iii) is 100 wt % and the amount of ethylene (ii), if present, is lower than the amount of alpha-olefin (iii),
whereby the copolymer or terpolymer optionally can be visbroken.

Suitable alpha-olefins having 4 to 20 carbon atoms include 1-butene, 1-pentene, 1-hexene and 1-octene. Preferred alpha-olefins are 1-butene or 1-hexene. In a specific embodiment the random copolymer is a copolymer of propylene and 1-butene only and the terpolymer is a terpolymer of propylene, ethylene and 1-butene only.

The copolymer as well as the terpolymer has a rather high content of propylene (C3), i.e. at least 80.0 wt % and preferably at least 85.0 wt %.

Thus, the random copolymer has an alpha-olefin content, i.e. preferably a 1-butene or 1-hexene content, of 1.5 to 20.0 wt %, preferably between 5.0 to 15.0 wt %.

A requirement of the terpolymer is that the amount of ethylene within the terpolymer is lower compared to the amount of the alpha-olefin.

Accordingly the ethylene content within the terpolymer is in the range of 0.5 to 5.0 wt %, preferably in the range of 0.8 to 3.0 wt % and more preferably in the range of 1.0 to 2.0 wt %.

Further the alpha-olefin, i.e. preferably the 1-butene or 1-hexene, within the terpolymer is in the range of 1.5 to 15.0 wt %, preferably in the range of 2.0 to 12.0 wt % and more preferably in the range of 3.0 to 10.0 wt %.

Furthermore, it is preferred that the propylene based random copolymer (RACOPO) or terpolymer (TERPO) suitable for layer C has a melt flow rate (MFR) given in a specific range. The melt flow rate measured under a load of 2.16 kg at 230° C. (ISO 1133) is denoted as $MFR_2$.

Accordingly, it is preferred that the propylene based random copolymer (RACOPO) or terpolymer (TERPO) has a melt flow rate $MFR_2$ measured according to ISO 1133 in the range of 0.5 to 20.0 g/10 min, more preferably in the range of 0.8 to 15.0 g/10 min, still more preferably in the range of 0.9 to 10.0 g/10 min, yet still more preferably in the range of 1.0 to 8.0 g/10 min.

The melting temperature (Tm) measured according to ISO 11357-3 of propylene based random copolymer (RACOPO) or terpolymer (TERPO) is preferably at least 125.0° C., more preferably of at least 128° C. and still more preferably of at least 130° C.

Thus it is in particular appreciated that the melting temperature (Tm) measured according to ISO 11357-3 of propylene based random copolymer (RACOPO) or terpolymer (TERPO) is in the range of 125 to 155° C., more preferably in the range of 128 to 150° C. and still more preferably in the range of 130 to 145° C.

Additionally the propylene based random copolymer (RACOPO) or terpolymer (TERPO) can be defined by the xylene cold soluble (XCS) content. Accordingly the propylene based random copolymer (RACOPO) or terpolymer (TERPO) is preferably featured by a xylene cold soluble (XCS) content of below 30.0 wt %, more preferably of below 20.0 wt % and yet more preferably equal or below 10.0 wt %

Thus it is in particular appreciated that propylene based random copolymer (RACOPO) or terpolymer (TERPO) has a xylene cold soluble (XCS) content in the range of 0.5 to 20.0 wt %, more preferably in the range of 1.0 to 15.0 wt % and yet more preferably in the range of 2.0 to 10.0 wt %.

The propylene based random copolymer (RACOPO) or terpolymer (TERPO) suitable for the present invention furthermore have a Vicat A softening temperature higher than 80° C. measured according to ISO 306. Preferably the Vicat A softening temperature is in the range of 85° C. to 150° C., more preferably in the range of 90° C. to 140° C. and still more preferred in the range of 100° C. to 130° C. and most preferably in the range of 95° C. to 125° C.

Suitable propylene based random copolymers (RACOPO) or terpolymers (TERPO) are commercially available or can be prepared by known processes.

The polymerization process for the production of the propylene based random copolymer (RACOPO) or terpolymer (TERPO) may be a continuous process or a batch process utilising known methods and operating in liquid phase, optionally in the presence of an inert diluent, or in gas phase or by mixed liquid-gas techniques.

Accordingly, the propylene based random copolymer (RACOPO) or terpolymer (TERPO) may be produced by single- or multistage process polymerization of propylene and α-olefin and optional ethylene such as bulk polymerization, gas phase polymerization, slurry polymerization, solution polymerization or combinations thereof using conventional catalysts. Preferably, the copolymer or terpolymer is made either in one or two loop reactor(s) or in a combination of loop and gas phase reactor. Those processes are well known to one skilled in the art.

The process is preferably carried out in the presence of a stereospecific catalyst system.

A suitable catalyst for the polymerization of the propylene based random copolymer (RACOPO) or terpolymer (TERPO) is any stereospecific catalyst for propylene polymerization which is capable of polymerizing and copolymerizing propylene and α-olefin-comonomers at a temperature of 40 to 110° C. and at a pressure from 10 to 100 bar. Ziegler Natta catalysts as well as metallocene catalysts are suitable catalysts.

One skilled in the art is aware of the various possibilities to produce random propylene copolymers and terpolymers and will simply find out a suitable procedure to produce suitable polymers which are used in the present invention.

Suitable propylene based random copolymer (RACOPO) or terpolymer (TERPO) can optionally be visbroken.

As Ziegler-Natta catalyst any ordinary stereospecific Ziegler-Natta catalysts can be used. An essential component in those catalysts are solid catalyst components comprising a titanium compound having at least one titanium-halogen bond, an internal electron donor compound and a magnesium halide in active form as a carrier for both the titanium component and the donor compound. The catalysts can contain—as internal electron donor—compounds selected from ethers, ketones, lactones, compounds containing N, P and/or S atoms and esters of mono and dicarboxylic acids. Preferred are aromatic esters like benzoates or phthalates, e.g. ethyl benzoate or, diisobutylphtalat, or diethers like 2,2-diisopropyl-1,3-dimethoxypropene.

Any metallocene catalyst capable of catalysing the formation of a propylene based random copolymer (RACOPO) or terpolymer (TERPO) can also be used. A suitable metallocene catalyst comprises a metallocene/activator reaction product, which is typically impregnated in a porous support at maximum internal pore volume. The catalyst complex comprises a ligand which is typically bridged, and a transition metal of group IVa . . . VIa, and an organoaluminium compound. The catalytic metal compound is typically a metal halide, e.g. $ZrCl_2$.

In addition to the propylene based random copolymer (RACOPO) or terpolymer (TERPO) layer C may also contain a heterophasic propylene copolymer (HECO).

Suitable HECOs are those as described for layer A.

In case there is also a HECO present in layer C the amount of RACOPO or TERPO is at least 60 wt % based on layer C, preferably at least 65 wt % and more preferably at least 70 wt %, based on layer C. Thus the amount of HECO is at most 40 wt %, preferably at most 35 wt % and more preferably at most 30 wt %, based on layer C.

Optionally, additives conventionally used in polyolefin-based film materials, for example antioxidants, neutralizer, inorganic fillers, antiblocking agents, nucleation agents, lubricants or antistatic agents, may be added to any of the above described polymers (HECO, HIPP, RACOPO, TERPO)

Multilayer Film

According to the present invention the multilayer film comprises at least the three layers A, B and C. Preferably the multilayer film according to the present invention is composed of layer A being the outer layer, layer B being the core layer and layer C being the sealing layer.

The terms sealing layer, core layer and outer layer are understood as commonly known in the art.

The sealing layer is located, i.e. joined, on the one side (surface) of the core layer and the outer layer is located, i.e. joined, on the other side (surface) of the core layer. Accordingly the multi-layer film has the stacking order (A)-(B)-(C).

The multilayer, e.g. the three-layer film of the present invention is prepared with the cast-film technology.

In case the film is produced by cast film technology the molten polymers are extruded through slot extrusion dies onto a chill roll to cool the polymers to a solid film of at least three layers. Typically the polymers of each respective individual layer are firstly compressed and liquefied in an extruder. It is possible for any additives to be already added to the polymers or introduced at this stage via a masterbatch. The melt is then forced through a flat-film die (slot die), and the extruded film is taken off on one or more take-off rolls, during which it cools and solidifies. It has proven particularly favourable to keep the take-off roll or rolls, by means of which the extruded film is cooled and solidified, at a temperature from 10 to 40° C., preferably from 12 to 25° C. A co-extrusion adapter (feed block) joins the different polymers of the respective layers to the final film structure. The melts of the different polymers are then forced simultaneously through a flat-film die (slot die), and the extruded multi-layer film is taken off on one or more take-off rolls, during which it cools and solidifies.

Optionally the outer layer of the multi-layer polymer film can be corona-or flame-treated by one of the known methods. For the corona treatment, the film is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 45 dynes/cm after production.

The films of the invention are preferably 100 to 600 microns in thickness before orientation, preferably 100 to 400 microns.

The outer layer, the core layer and the sealing layer may all be of equal thickness or alternatively the core layer may be thicker than the outer layer and the sealing layer.

A convenient film comprises an outer layer and a sealing layer, which can each form 5 to 33%, preferably 8 to 25% of the thickness of the film, the core layer forming the remaining thickness, e.g. 33% to 90%.

The multilayer film is then uniaxially oriented in the machine (or processing) direction (MDO). During the MDO, the film obtained from the cast-film line is heated to an orientation temperature. Preferably, the temperature range for orientation can be 25K below the VICAT A-level of the outer film layer material up to the melting temperature of the outer film layer material. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time.

The annealing temperature is preferably within the same temperature range as used for stretching or slightly below (e.g. 10 to 20K below), with room temperature being the lower limit. Finally, the film is cooled through cooling rollers to an ambient temperature.

The ratio of the film thickness before and after orientation is called "drawdown ratio."

The drawdown ratio varies depending on many factors including the desired film thickness, film properties, and multilayer film structures.

Preferably, the draw-down ratio is such that the film is at or near maximum extension. Maximum extension is the draw-down film thickness at which the film cannot be drawn further without breaking. The film is said to be at maximum extension when machine direction (MD) tensile strength has a less than 100% elongation at break under ASTM D-882.

The preparation process of a uniaxially oriented in MD multilayer film of the invention comprises at least the steps of forming a layered film structure and stretching the obtained multilayer film in the machine direction in a draw ratio of at least 1:3 up to 1:12, preferably 1:4 to 1:10 and more preferably 1:4.5 to 1:7.

The film is stretched at least 3 times up to 12 times, its original length in the machine direction. This is stated herein as a draw ratio of at least 1:3, i.e. "1" represents the original length of the film and "3" denotes that it has been stretched to 3 times that original length. An effect of stretching (or drawing) is that the thickness of the film is similarly reduced. Thus a draw ratio of at least 1:3 preferably also means that the thickness of the film is at least three times less than the original thickness.

After orientation, the film of the invention is typically 15 to 150 µm, more preferably 20 to 120 µm in thickness. It is especially preferred if the films are 20 to 100 µm in thickness after orientation, such as 25 to 90 microns.

The orientation step can be done in-line, i.e. the orientation step is performed immediately after the cast film production.

Otherwise the orientation step can be done off-line, i.e. the orientation step is performed several hours/days after the cast film production.

The off-line alternative can lead to higher mechanical properties, like tensile modulus, of the MDO film. Without being bound to any theory inventors think that this is due to post-crystallization steps, which are still ongoing in the in-line production step, whereas in the off-line production step such post-crystallization behaviour has already decreased or even disappeared.

The machine direction oriented multilayer cast films according to the invention show very advantageous properties.

The multilayer film according to the invention has a tensile modulus measured according to ISO 527-3 on a 50 µm film in machine direction of at least 2600 MPa, preferably of at least 2700 MPa and more preferably of at least 2800 MPa.

The tensile modulus of the inventive film measured according to ISO 527-3 on a 50 µm film in transverse direction is at least 1200 MPa, preferably at least 1300 MPa and more preferably at least 1350 MPa.

Furthermore the multilayer film according to the invention has excellent optic properties. The haze measured according to ASTM D1003 on a 50 µm film is at most 5.5%, preferably at most 5.0% and more preferably at most 4.5%.

Additionally the transparency measured according to ASTM D1003 on a 50 µm film is at least 90%, preferably at least 92% and more preferably at least 94%.

Furthermore clarity measured according to ASTM D1003 on a 50 µm film is at least 90%, preferably at least 92% and more preferably at least 94%.

The multilayer film according to the invention furthermore is characterized by a low shrinkage.

Thus the thermal shrinkage measured according to the method as described in the experimental part on a 50 µm film after 10 minutes at 100° C. in machine direction is at most −3.0%, preferably at most −2.8%.

Additionally the shrinkage measured according to the method as described in the experimental part on a 50 µm film after 10 minutes at 150° C. in the machine direction is at most −13.0%, preferably at most −12.0%.

The multilayer film according to the invention is suitable for being sterilized, especially by steam sterilization.

Thus the present invention is also related to a machine direction oriented multilayer cast film, which has been treated with a steam sterilization step at a temperature of above 110° C. Preferably, said step of steam sterilization is carried out at a temperature of 121° C. or higher.

Preferably, said step of steam sterilization is carried out for at least 5 minutes, more preferably at least 10 minutes, more preferably at least 20 minutes, still more preferably at least 30 minutes.

Particularly, said steam sterilization is usually carried out at a temperature of below 170° C. Particularly, said steam sterilization is usually carried out no longer than 2 hours.

The multilayer film according to the invention is in addition characterized by a high seal strength, if sealed to an aluminum foil or an oriented polyamide film (OPA) before and after being subjected to steam sterilization, thus being suitable for the use in retortable stand up pouches.

Therefore the present invention is related to the use of the machine direction oriented multilayer cast film as described above as sealing film in retortable stand up pouches.

In a further aspect of the present invention is the use of the machine direction oriented multilayer cast film as described above in laminates.

In yet another aspect the present invention is related to laminates comprising the multilayer film as described above laminated to a barrier layer.

The films of the invention may incorporate barrier layers as is known in the art. For food and medical applications for example, it may be necessary to incorporate a barrier layer, i.e. a layer which is impermeable to water and oxygen, into the film structure. This can be achieved using conventional lamination techniques. Suitable barrier layers are known and include (oriented) polyamide, ethylene vinyl alcohol, PET and (metallised) Al layers.

The machine direction oriented multilayer cast film of the present invention is especially suitable to be laminated to (metallised) Al-layers or (oriented) polyamide.

The seal strength of the machine direction oriented (MDO) multilayer cast film according to the invention between the cast film and a further layer comprising Al-layer in a laminate structure of 12 µm oriented polyester (PET)/9 µm Al-layer/50 µm MDO multilayer cast film, is, if sealed at 170° C., at least 40 N/15 mm, preferably at least 45 N/15 mm before and after steam sterilization at 121° C. for 30 min.

The used PET layer and Al-foil-layer are standard layers used for lamination and are commercially available.

The individual layers can be mutually joined with an adhesion promoting agent, adhesive, lacquer laminating adhesive, as a connecting layer. Typical adhesives are solvent-containing or solvent-free or watery acrylate adhesives or polyurethane adhesive systems.

The seal strength of the machine direction oriented (MDO) multilayer cast film according to the invention between the cast film and a further layer comprising oriented polyamide in a laminate structure of 12 μm oriented polyester (PET)/15 μm oriented polyamide layer/50 μm MDO multilayer cast film, is, if sealed at 200° C., is at least 45 N/15 mm, preferably at least 50 N/15 mm before steam sterilization at 121° C. for 30 min and at least 32 N/15 mm, preferably at least 35 N/15 mm after steam sterilization at 121° C. for 30 min.

The used PET layer and oriented polyamide layer are standard layers used for lamination and are commercially available.

Again the individual layers can be mutually joined with an adhesion promoting agent, adhesive, lacquer laminating adhesive, as a connecting layer. Typical adhesives are solvent-containing or solvent-free or watery acrylate adhesives or polyurethane adhesive systems.

The seal strength is measured according to the method described in the Experimental Part.

In principle, the seal strength can be measured by tearing the welding seam of the PP film laminated to the barrier layer, which are joined by welding, with defined speed until the seam breaks.

The laminates comprising the multilayer film according to the invention are also suitable for being sterilized, especially by steam sterilization.

Experimental Part:

A) Description of Measurement Methods

Decaline Solubles (DS):

A 2 g polymer sample is dissolved in 100 ml stabilised decahydronaphthalene (=decaline) by heating at 160° C. and stirring for 1 hr. The solution is cooled at room temperature for one hour and then placed in a water bath at 25° C. for 1 hour.

The solution is filtrated. 20 ml of the filtrate is transferred quantitatively in a tarred aluminum pan. The pan is placed on a hot plate at 195° C., blanketed with a slow stream of nitrogen. When the residue in the pan is almost dry, the pan is placed in a vacuum oven at 140° C. for 2 hours.

The total solids concentrate of the filtrate is as a measure for the soluble fraction.

Calculated as decaline soluble={(gram of residue)/(gram of sample)}×5×100%

Transparency, Haze and Clarity

All optical parameters were measured on 50 μm thick cast films. Transparency, haze and clarity were determined according to ASTM D 1003.

Tensile Modulus

Tensile tests according to ISO 527 at a temperature of 23° C. were carried out on 10 mm wide strips cut in machine direction from 50 μm thick cast films.

Shrinkage of the MDO film was measured in analogy to ISO 11501—"Determination of dimensional change on heating".

Thermal shrinkage was assessed for film samples of dimensions 100 mm×100 mm are cut out from the film sample in both MD and TD.

Shrinkage was measured from the films by putting 10 pieces of film (200 mm×10 mm) on a talcum bed in an oven with the selected temperature. The shrinkage was measured after 10 minutes either at 100° C. or at 150° C.

Sealing Initiation Temperature (SIT) of MDO Film According to the Invention:

The method determines the sealing temperature range (sealing range) of polypropylene films according to ISO 17557. The lower limit (heat sealing initiation temperature (SIT)) is the sealing temperature at which a sealing strength of >3N/15 mm is achieved. The upper limit (sealing end temperature (SET)) is reached, when the films stick to the sealing device.

For sealing the laboratory sealing device KOPP SGPE-20 was used. The film thickness was 50 μm, specimen width was 15 mm Sealing force 400N Seal Time: 1 sec Cool time: 30 sec Peel Speed: 100 mm/sec Start temperature: 80° C.

End temperature: 150° C.

Specimen is sealed sealing layer (SL) to sealing layer (SL) at each sealbar temperature and seal strength (force) is determined at each step.

Seal Strength Measured on Laminates:

The laminated structures (12 μm PET-layer/9 μm Al-layer/50 μm MDO film according to the invention and 12 μm PET-layer/15 μm OPA-layer/50 μm MDO film according to the invention) were made via heat sealing. The heat sealing process comprised a first heat sealing step followed by a curing step at ambient temperature for at least 24 hours then followed by measuring the bond strength on a tensile tester. Heat sealing was performed on a Kopp Lab sealer SGPE 20 equipped with 5 mm wide sealing bars coated with 0.5 mm Teflon coatings under following conditions: sealing time of 1 second at sealing force 400 N and various seal bar temperatures, i.e. 170° C. and 200° C. Sample specimens of 15 mm width were prepared after 24 hour storage at ambient temperature. The bond strength was performed on a Lloyd Instruments Ltd, tensile tester LRSK, applying a set grip distance of 35 mm. Bond strength was measured in force (N) per specimen width (15 mm) pulling the MDO layer from the Al- or OPA-layer at a cross head speed of 100 mm/min reporting the average bond strength in N/15 mm over the sealed width of 5 mm. Heat sealing is used as a model describing the bond achieved with heat induced sealing as well as for heat induced lamination applying in both the three main parameters temperature, time and pressure to meeting interfaces.

Used Polymers:

The starting materials for the films produced in the present examples are commercially available and had the following properties:

INVENTIVE EXAMPLES IE-1 AND IE-2

Layer A) and optional in Layer C): heterophasic propylene copolymer, Borpact™ BC918CF, distributed by Borealis)

The copolymer has an ethylene content of 2.4 wt % and a xylene soluble fraction (EPR content) at RT of 14 wt %. The $MFR_2$ (230° C.; 2.16 kg) is 3.0 g/10 min. The density is 905 kg/m$^3$ and the melting point 167° C. The polymer is nucleated by the BNT-technology) and contains 0.0004 wt % of poly(vinylcyclohexane) as alpha-nucleating agent.

Layer B) high isotacticity polypropylene homopolymer (HIPP) was prepared according to Example 1 of EP 1883659 and had the following properties:

$MFR_2$ (230° C.; 2.16 kg) of 3.6 g/10 min; mmmm pentad of 97.65%; XCS of 1.3%, PI of 6.1, MWD of 8, Tm of 163.5° C.

Layer C): commercial propylene-ethylene-1-butene terpolymer Borseal™ TD220BF of Borealis having a melt flow rate $MFR_2$ (230° C.) of 6 g/10 min, a melting temperature Tm of 132° C.

IE-1:

Layer A: 100 wt % of BC918CF (thickness: 10% of total film)
Layer B: 100 wt % of HC110BF (thickness: 80% of total film)
Layer C: 100 wt % of TD220BF (thickness: 10% of total film)

IE-2:

Layer A: 100 wt % of BC918CF (thickness: 10% of total film)
Layer B: 100 wt % of HC110BF (thickness: 80% of total film)
Layer C: 75 wt % of TD220BF+25 wt % of BC918CF (thickness: 10% of total film)

COMPARATIVE EXAMPLES CE-1, CE-2 AND CE-3

Additional Polymers Used:

BA110CF: heterophasic propylene-ethylene impact copolymer (distributed by Borealis) with $MFR_2$ (230° C./2.16 kg) of 0.85 g/10 min, a melting temperature Tm of 166° C., an ethylene content of 8 wt %, XCS of 16.7 wt.-%, and a density of 910 kg/cm³. The ethylene content of the XCS is 40 wt %.

BE170CF: heterophasic propylene-ethylene copolymer (distributed by Borealis) with $MFR_2$ (230° C./2.16 kg) of 13.0 g/10 min, a melting temperature Tm of 164° C., an ethylene content of 8.2 wt %, XCS of 17.0 wt %.

CE-1:

Layer A: 30 wt % of BA110CF+40 wt % of BC918CF+30 wt % of BE170CF (thickness: 10% of total film)
Layer B: 30 wt % of BA110CF+40 wt % of BC918CF+30 wt % of BE170CF (thickness: 80% of total film)
Layer C: 75 wt % of TD220BF+25 wt % of BC918CF (thickness: 10% of total film)

CE-2:

Layer A: 30 wt % of BA110CF+40 wt % of HC110BF+30 wt % of BEI 70CF (thickness: 10% of total film)
Layer B: 30 wt % of BA110CF+40 wt % of HC110BF+30 wt % of BE170CF (thickness: 80% of total film)
Layer C: 75 wt % of TD220BF+25 wt % of BC918CF (thickness: 10% of total film)

CE-3:

Layer A: 100 wt % of HC110BF (thickness: 10% of total film)
Layer B: 30 wt % of BA110CF+40 wt % of HC110BF+30wt % of BE170CF (thickness: 80% of total film)
Layer C: 75 wt % of TD220BF+25wt % of BC918CF (thickness: 10% of total film)

Production of Films

Three layer films were produced at three layer coextusion cast film line, the film structure was A-B-C with a split of the layers: core layer (B) 80%, outer layer (A) 10% and one sealing layer (C) 10%.

The melt temperature of the polymers was in the range of 247° C. to 252° C. in the extruder die. The throughput for all three layers was in sum 60 kg/h. The take of speed of the film was 27.5 m/min to 31 m/min as a film width of 60 cm. The temperature of the chill roll was in the range of 13° C. to 20° C. The temperature of the water bath was in the range of 15° C. to 20° C. The obtained three-layer film had a thickness of 250 μm.

Orientation Process

The machine direction orientation was performed on a commercially available MDO unit. The unit consists of preheating, drawing, annealing, and cooling sections, with each set at specific temperatures to optimize the performance of the unit and produce films with the desired properties.

Orientation is achieved by reheating the non-oriented polypropylene film at a temperature of 105° C., the stretching was done at 125° C., cooling and annealing was done at 110° down to 40° C.

Inlet speed was 10 m/min, outlet speed was then 50 m/min. Drawdown ratio (DDR) was around 1:5, thus yielding a 25 μm MDO film.

While one part of the film was used for primary testing of mechanics and optics, another part was used for preparing the laminates, which were also subjected to a steam sterilization step at 121° C. for 30 minutes. All results of the mechanical and optical characterization are summarized in Table 1.

Sterilization Process

The sterilization was done by subjecting the laminates to saturated steam of 121° C. for 30 minutes.

Lamination Process

Two Laminate Structures were Prepared:

12 μm PET-layer/9 μm Al-foil-layer/50 μm MDO film according to the invention and 12 μm PET-layer/15 μm OPA-layer/50 μm MDO film according to the invention Commercially available standard 12 μm PET-films, 15 μm OPA-films and 9 μm Al-foil were used besides the MDO film according to the invention The lamination step was done on a commercially available lamination machine. As adhesive between the layers a commercially available two component solvent-based polyurethane adhesive from H. B. Fuller was used.

TABLE 1

| Property | | unit | IE-1 | IE-2 | CE-1 | CE-2 | CE-3 |
|---|---|---|---|---|---|---|---|
| Film thickness | | μm | 53 | 61 | 55 | 60 | 55 |
| Tensile test MD | Tensile Modulus | MPa | 3195 | 3135 | 2298 | 2442 | 2548 |
| | Tensile Strain at Yield | % | 33 | 30 | 33 | 33 | 30 |
| | Tensile Strain at Break | % | 34 | 35 | 34 | 39 | 30 |
| Tensile test TD | Tensile Modulus | MPa | 1438 | 1541 | 980 | 1139 | 1171 |
| | Tensile Strain at Yield | % | 5 | 5 | 7 | 6 | 4 |
| Optics | Transparency | % | 94.7 | 94.7 | 94.7 | 94.6 | 94.6 |
| | Haze | % | 4.4 | 4.1 | 12.9 | 12.5 | 6.0 |
| | Clarity | % | 96.6 | 96.7 | 91.3 | 88.0 | 89.3 |

TABLE 1-continued

| Property | | unit | IE-1 | IE-2 | CE-1 | CE-2 | CE-3 |
|---|---|---|---|---|---|---|---|
| SIT | Initial Sealing Temp. | °C. | 132 | 138 | 138 | 138 | 138 |
| Shrinkage | 100° C. MD | % | −2.3 | −2.7 | −5.0 | −4.1 | −3.3 |
| | 150° C. MD | % | −11.0 | −11.4 | −20.5 | −13.2 | −15.1 |
| Seal Strength 170° C./1 s | Structure PET/AL/PP before sterilization | N/15 mm | 65.6 | 48.1 | 51.9 | 52.6 | 46.6 |
| | After sterilization | N/15 mm | 46.3 | 49.7 | 29.0 | 33.8 | 34.3 |
| 200° C./1 s | Structure PET/OPA/PP before sterilization | N/15 mm | 57.8 | 51.0 | 33.0 | 36.5 | 35.2 |
| | After sterilization | N/15 mm | 42.5 | 35.8 | 28.3 | 24.6 | 30.9 |

From Table 1 it can be easily seen that the PP sealing films according to the present invention have improved Tensile Modulus in machine direction as well as transverse direction as well as improved optics (e.g. lower haze).

Furthermore the shrinkage of the PP sealing films according to the present invention is clearly lower compared to the comparative film structures.

Additionally the Seal Strength in the different lamination structures is improved by using the MDO 3-layer cast film according to the invention as sealing layer.

What is claimed is:

1. A multilayer cast film oriented in machine direction, the multilayer cast film comprises at least three layers A, B and C, wherein
   a) layer A is an outer layer comprising a heterophasic propylene copolymer, wherein the heterophasic propylene copolymer of layer A comprises
      a-a) 75 to 95 wt % of a polypropylene matrix (PP-M) with an $MFR_2$ (ISO 1133, 230° C., 2.16 kg) of 0.5 to 30.0 g/10 min being a homopolymer or a copolymer which has a comonomer content of less than 10.0 wt %,
      a-b) 5 to 25 wt % of a propylene/alpha-olefin rubber (EPR) with at least 50 wt % propylene having an intrinsic viscosity (IV) of 0.8 to 2.5 dl/g, and
      a-c) 0.0001 to 1 wt % of an alpha-nucleating agent (NA);
   b) layer B is a core layer comprising a high isotacticity polypropylene homopolymer, wherein the high isotacticity polypropylene homopolymer of layer B is characterized by
      (b-i) an isotacticity expressed in mmmm pentads of at least 96 mol %, measured by means of 13 C-NMR,
      (b-ii) a decaline soluble content of 2.0 wt % or below, and
      (b-iii) polydispersity index (PI) of at least 5.5;
   and
   c) layer C is a sealing layer comprising a propylene based random copolymer or a propylene based terpolymer, optionally in combination with a heterophasic propylene copolymer, wherein the propylene based random copolymer or terpolymer of layer C comprises
      (c-i) 80.0 to 98.0 wt % of propylene,
      (c-ii) up to 5.0 wt % of ethylene, and
      (c-iii) 1.5 to 20.0 wt % of an alpha-olefin having 4 to 20 carbon atoms,
      wherein the sum of (c-i), (c-ii), (c-iii) is 100 wt % and the amount of ethylene (c-ii), if present, is lower than the amount of alpha-olefin (c-iii),
   wherein the machine direction oriented multilayer cast film has
      (i) a tensile modulus measured according to ISO 527-3 on a 50 μm film in machine direction of at least 2600 MPa and in transverse direction of at least 1200 MPa,
      (ii) a haze value measured according to ASTM D1003 on a 50 μm film of at most 5.5%, and
      (iii) a shrinkage measured according to the method as described in the experimental parton a 50 μm film after 10 minutes at 100° C. in machine direction of at most −3.0%.

2. The multilayer cast film oriented in machine direction according to claim 1, wherein
   the copolymer or terpolymer of layer C has been visbroken.

3. The multilayer cast film oriented in machine direction according to claim 2, wherein
   A: the propylene/alpha-olefin rubber (EPR) of the heterophasic propylene copolymer of layer A is a propylene/ethylene rubber and the heterophasic propylene copolymer is alpha nucleated by a reactor technique, and wherein a catalyst used for preparing the heterophasic propylene copolymer is prepolymerized with at least one vinyl compound,
   B: the high isotacticity polypropylene homopolymer of layer B has a melting point of at least 162° C., and
   C: the propylene based random copolymer is a propylene-1-butene random copolymer and the propylene based terpolymer is a propylene-ethylene-1-butene terpolymer with an ethylene content of 0.5 to 5.0 wt %.

4. The multilayer cast film oriented in machine direction according claim 1, wherein the multilayer case film has a thickness of 100 to 600 microns before orientation and after being stretched in machine direction with a draw ratio of 1:3 up to 1:12 has a thickness of 15 to 150 microns.

5. The multilayer cast film oriented in machine direction according claim 1, wherein the multilayer cast film is suitable for being treated with a steam sterilization step at a temperature of above 110° C.

6. A laminate comprising a multilayer case film oriented in machine direction, wherein the multilayer cast film comprises at least three layers A, B and C, wherein
   a) layer A is an outer layer comprising a heterophasic propylene copolymer, wherein the heterophasic propylene copolymer of layer A comprises
      a-a) 75 to 95 wt % of a polypropylene matrix (PP-M) with an $MFR_2$ (ISO 1133, 230° C., 2.16 kg) of 0.5 to 30.0 g/10 min being a homopolymer or a copolymer which has a comonomer content of less than 10.0 wt %, a-b) 5 to 25 wt % of a propylene/alpha-olefin rubber (EPR) with at least 50 wt % propylene having an intrinsic viscosity (IV) of 0.8 to 2.5 dl/g, and a-c) 0.0001 to 1 wt % of an alpha-nucleating agent (NA);

b) layer B is a core layer comprising a high isotacticity polypropylene homopolymer, wherein the high isotacticity polypropylene homopolymer of layer B is characterized by (b-i) an isotacticity expressed in mmmm pentads of at least 96 mol%, measured by means of 13C-NMR, (b-ii) a decaline soluble content of 2.0 wt % or below, and (b-iii) polydispersity index (PI) of at least 5.5;

and c) layer C is a sealing layer comprising a propylene based random copolymer or a propylene based terpolymer, optionally in combination with a heterophasic propylene copolymer, wherein the propylene based random copolymer or terpolymer of layer C comprises (c-i) 80.0 to 98.0 wt % of propylene, (c-ii) up to 5.0 wt % of ethylene, and (c-iii) 1.5 to 20.0 wt % of an alpha-olefin having 4 to 20 carbon atoms, wherein the sum of (c-i), (c-ii) and (c-iii) is 100 wt % and the amount of ethylene (c-ii), if present, is lower than the amount of alpha-olefin (c-iii), wherein the machine direction oriented multilayer cast film has (i) a tensile modulus measured according to ISO 527-3 on a 50 μm film in machine direction of at least 2600 MPa and in transverse direction of at least 1200 MPa, (ii) a haze value measured according to ASTM D1003 on a 50 μm film of at most 5.5%, and (iii) a shrinkage measured in analogy to ISO 11501 on a 50 μm film after 10 minutes at 100° C. in machine direction of at most −3.0%, wherein the shrinkage is measured by putting 10 pieces of film on a talcum bed in an oven with the selected temperature.

7. A retortable stand up pouch comprising a multilayer case film oriented in machine direction, wherein the multilayer cast film comprises at least three layers A, B and C, wherein a) layer A is an outer layer comprising a heterophasic propylene copolymer, wherein the heterophasic propylene copolymer of layer A comprises a-a) 75 to 95 wt % of a polypropylene matrix (PP-M) with an MFR$_2$ (ISO 1133, 230° C., 2.16 kg) of 0.5 to 30.0 g/10 min being a homopolymer or a copolymer which has a comonomer content of less than 10.0 wt %, a-b) 5 to 25 wt % of a propylene/alpha-olefin rubber (EPR) with at least 50 wt % propylene having an intrinsic viscosity (IV) of 0.8 to 2.5 dl/g, and a-c) 0.0001 to 1 wt % of an alpha-nucleating agent (NA);

b) layer B is a core layer comprising a high isotacticity polypropylene homopolymer wherein the high isotacticity polypropylene homopolymer of layer B is characterized by (b-i) an isotacticity expressed in mmmm pentads of at least 96 mol %, measured by means of 13C-NMR, (b-ii) a decaline soluble content of 2.0 wt % or below, and b-iii) polydispersity index (PI) of at least 5.5;

and c) layer C is a sealing layer comprising a propylene based random copolymer or a propylene based terpolymer, optionally in combination with a heterophasic propylene copolymer, wherein the propylene based random copolymer or terpolymer of layer C comprises (c-i) 80.0 to 98.0 wt % of propylene, (c-ii) up to 5.0 wt % of ethylene, and (c-iii) 1.5 to 20.0 wt % of an alpha-olefin having 4 to 20 carbon atoms, wherein the sum of (c-i), (c-ii) and (c-iii) is 100 wt % and the amount of ethylene (c-ii), if present, is lower than the amount of alpha-olefin (c-iii), wherein the machine direction oriented multilayer cast film has (i) a tensile modulus measured according to ISO 527-3 on a 50 μm film in machine direction of at least 2600 MPa and in transverse direction of at least 1200 MPa, (ii) a haze value measured according to ASTM D1003 on a 50 μm film of at most 5.5%, and (iii) a shrinkage measured in analogy to ISO 11501 on a 50 μm film after 10 minutes at 100° C. in machine direction of at most −3.0%, wherein the shrinkage is measured by putting 10 pieces of film on a talcum bed in an oven with the selected temperature.

8. The multilayer cast film oriented in machine direction according to claim 1, having a seal strength of at least 40 N/15 mm before and after steam sterilization at 121° C. for 30 min, between the multilayer cast film and a further layer comprising Al-foil-layer, wherein the laminate structure is 12μm oriented polyester (PET)/9μm Al-layer 50 μm machine direction oriented multilayer cast film, and the laminate has been sealed at 170° C.

9. The multilayer cast film oriented in machine direction according to claim 1 having a seal strength of at least 45 N/15 mm before steam sterilization at 121° C. for 30 min and at least 32 N/15 mm after steam sterilization at 121° C. for 30 min between the multilayer cast film and a further layer comprising oriented polyamide, wherein the laminate structure of 12μm oriented polyester (PET)/15μm oriented polyamide layer (OPA)/50 μm machine direction oriented multilayer cast film, and the laminate has been sealed at 200° C.

10. The multilayer cast film oriented in machine direction according to claim 8, having a seal strength between the multilayer cast film and the further layer of at least 45 N/15 mm before and after steam sterilization at 121° C. for 30 min.

11. The multilayer cast film oriented in machine direction according to claim 9, having a seal strength between the multilayer cast film and the further layer of at least 50 N/15 mm before steam sterilization at 121° C. for 30 minutes.

12. The multilayer cast film oriented in machine direction according to claim 9, having a seal strength between the multilayer cast film and the further layer of at least 35 N/15 mm after steam sterilization at 121° C. for 30 minutes.

13. The multilayer cast film oriented in machine direction according to claim 9, having a seal strength between the multilayer cast film and the further layer of at least 50 N/15 mm before steam sterilization at 121° C. for 30 minutes and at least 35 N/15 mm after steam sterilization at 121° C. for 30 minutes.

* * * * *